(12) United States Patent
Cropley et al.

(10) Patent No.: US 11,560,097 B2
(45) Date of Patent: Jan. 24, 2023

(54) SUPPORT SYSTEM FOR A REMOVABLE VEHICLE CANOPY

(71) Applicant: RHINO RACK AUSTRALIA PTY LIMITED, Sydney (AU)

(72) Inventors: Richard Cropley, Sydney (AU); William Davis, Sydney (AU); Nicholas Clarke, Sydney (AU)

(73) Assignee: RHINO RACK AUSTRALIA PTY LIMITED, Eastern Creek (AU)

( * ) Notice: Subject to any disclaimer, the term of this patent is extended or adjusted under 35 U.S.C. 154(b) by 100 days.

(21) Appl. No.: 17/287,263

(22) PCT Filed: Oct. 25, 2019

(86) PCT No.: PCT/AU2019/051172
§ 371 (c)(1),
(2) Date: Apr. 21, 2021

(87) PCT Pub. No.: WO2020/087108
PCT Pub. Date: May 7, 2020

(65) Prior Publication Data
US 2021/0394684 A1   Dec. 23, 2021

(30) Foreign Application Priority Data
Oct. 29, 2018   (AU) .............................. 2018904099

(51) Int. Cl.
*B60R 9/04* (2006.01)
*B60R 9/048* (2006.01)

(52) U.S. Cl.
CPC ............... *B60R 9/048* (2013.01); *B60R 9/04* (2013.01)

(58) Field of Classification Search
CPC .............. B60R 9/00; B60R 9/04; B60R 9/048
See application file for complete search history.

(56) References Cited

U.S. PATENT DOCUMENTS 3,595,452 A * 7/1971 Anderson ............... B60R 9/045
224/330
4,378,127 A * 3/1983 Rossi, Sr. ............. B62D 33/08
224/544

(Continued)

OTHER PUBLICATIONS

International Search Report, dated Nov. 25, 2019.
Written Opinion of the International Search Authority dated Nov. 25, 2019.

*Primary Examiner* — Scot T McNurlen
(74) *Attorney, Agent, or Firm* — Thomas M. Galgano, Esq.; Galgano IP Law PLLC

(57) ABSTRACT

In a first aspect, the present invention relates to a support system for mounting a load to a removable vehicle canopy on a vehicle, comprising a pair of support frames configured to be installed on opposing internal side walls of the removable vehicle canopy, a pair of support feet configured to be installed on an internal surface of the removable vehicle canopy, and a plurality of mounting elements on an external surface of the canopy and arranged for mounting the load thereto, each of the support frames and support feet having one of the plurality of mounting elements affixed thereto by a mechanical fastener extending through a hole in the canopy, wherein the support system is configured to be installable onto the removable vehicle canopy while the canopy is mounted to the vehicle, such that when the canopy having the support system installed is mounted to the vehicle, the support system substantially distributes the mounted load into the vehicle and substantially inhibits distribution into or through the canopy. The invention further includes a second aspect being a method of installation of an embodiment of the first aspect.

13 Claims, 4 Drawing Sheets

(56) References Cited

U.S. PATENT DOCUMENTS

| | | | | |
|---|---|---|---|---|
| 4,538,752 | A | * | 9/1985 | Welter ................. B60R 9/08 296/37.7 |
| D415,718 | S | * | 10/1999 | Aghaci ...................... D12/91 |
| 6,755,332 | B2 | * | 6/2004 | Crane .................. B60R 9/00 224/330 |
| 8,496,146 | B2 | * | 7/2013 | Badillo ............. B60R 9/0423 224/558 |
| 8,944,486 | B2 | * | 2/2015 | Donohoe ............. B60J 11/04 296/136.03 |
| 9,376,002 | B2 | * | 6/2016 | Bennett ................ B60J 7/061 |
| D920,886 | S | * | 6/2021 | Clarke .................... D12/406 |
| 2005/0092796 | A1 | * | 5/2005 | Essig ................... B60R 9/00 224/321 |
| 2011/0101056 | A1 | * | 5/2011 | Barkey ............... B60R 9/058 224/325 |
| 2013/0015218 | A1 | | 1/2013 | Srkin |
| 2014/0069971 | A1 | * | 3/2014 | van Kaathoven ...... B60R 9/058 224/329 |

* cited by examiner

SUPPORT SYSTEM FOR A REMOVABLE VEHICLE CANOPY

PRIORITY DETAILS

The present application claims priority from AU 2018904099, filed in Australia on 29 Oct. 2018, the entirety of which is incorporated herein by reference.

TECHNICAL FIELD

The present invention generally relates to a means of mounting a load to a removable vehicle canopy, and more particularly to support system that can be installed on an internal surface of a vehicle canopy in situ on a vehicle.

BACKGROUND

Vehicle roofs provide a suitable surface for storing, mounting and transporting additional cargo, equipment and other loads. However, not every vehicle is equipped to receive a load directly onto a roof or canopy surface of the vehicle. Although many utility vehicles may have inbuilt mounting points, other vehicles may lack these features, even though the vehicle may be structurally and mechanically capable of carrying additional load.

One particular example of such a vehicle is one that comprises a removable vehicle canopy. Many utility vehicles that have a truck bed may be fitted with a removable vehicle canopy, and certain other vehicles (for example, the 'Jeep Wrangler' manufactured by Chrysler) may also comprise a removable hard-shelled canopy that similarly lacks the necessary structural elements to enable supporting a load upon the canopy.

Removable vehicle canopies are typically hollow shells constructed of plastic and/or fibreglass, and generally lack the necessary structural reinforcement that would enable supporting a significant load thereupon. As the skilled person will appreciate, a removable vehicle canopy is not designed to support heavy loads, and will have a 'maximum load tolerance', being the maximum load that can be safely supported by the removable vehicle canopy. Although many prior art examples may be found wherein a roof rack or similar load-carrying structure is mounted to a removable canopy, these racks are typically mounted directly to the canopy and so are only able to carry very light loads. The maximum load tolerance is typically measured in tens of kilograms; for example, the removable canopy of the aforementioned Jeep Wrangler is able to safely support a load of approximately 45 kilograms.

Prior art systems and assemblies provide some means of overcoming this problem. Once such example may be seen in FIG. 1, which depicts one such prior art system comprising an external frame. This prior art solution enables the vehicle itself to support the weight of a load carried on a mounted load-carrying structure, without risking damage to the canopy. However, such a solution is difficult to mount or dismount as needed and can further impact the ability to further modify the vehicle to the tastes and/or needs of the consumer. In addition, the external frame can increase wind resistance and may generate sounds such as whistling when the vehicle is travelling. Furthermore, the prior art solution may lack in aesthetic appeal to some consumers.

A further prior art solution, developed by the applicant (Rhino Rack Australia Pty Ltd), is shown in FIG. 2. This prior art solution overcomes many of the issues provided by external frame systems, by providing a support frame that is internally located. This overcomes the potential issues of wind resistance, whistling and other vehicle noise, as well as maintaining the original aesthetic appearance of the vehicle. However, this prior art solution requires significant work to install on a vehicle. Due to the size and shaping of several of the prior art support elements, the vehicle canopy was required to be dismounted from the vehicle prior to installation. A vehicle canopy itself is typically large, cumbersome and heavy, which resulted in the installation requiring multiple people to perform. The prior art solution also failed to provide means of easily locating and installing the various prior art mounting elements that are affixed to an external surface of the vehicle canopy, which required drilling apertures in the canopy. This was typically done by supplying a paper or cardboard template to facilitate an operator in drilling the holes in the canopy. As a result, vehicle canopies could become damaged due to attachment of the mounting elements in the incorrect locations, which may require further drilling of apertures to properly locate the installation sites for the various mounting elements.

An additional prior art solution is depicted in United States patent application publication US 2014/0069971. Similarly to the prior art solution provided by Rhino Rack Australia Pty Ltd and discussed above, this solution provides an internally-located support frame system. However, this suffers from similar issues to the previously-discussed prior art solution, in that the installation process is complex and requires the removal of the vehicle canopy form the vehicle. The prior art solution disclosed by US 2014/0069971 utilises weight transfer brackets, having a first and second plate section that are perpendicular to one another.

the method of installing the prior art weight transfer plates, however, requires removal of a manufacturer-installed bracket component of the vehicle. In addition and with reference to FIG. 3, the prior art weight transfer brackets are positioned to sit at location P10, which is positioned on an outer top surface of vehicle pillar P12. The prior art weight transfer brackets therefore sit sandwiched between the outer top surface of vehicle pillar P12 and vehicle canopy P14, and therefore the canopy of the vehicle must be removed in order to the prior art support frame system of US 2014/0069971. Finally, as the prior art weight transfer brackets are not fixed to the chassis of the vehicle, they are only capable of distributing compressive loads exerted by a mounted load-carrying structure.

There is therefore a need for a means of mounting a load to a removable vehicle canopy mounted to a vehicle that overcomes the above problems associated with the prior art, or at least provides an alternative thereto.

DISCLOSURE OF THE INVENTION

In a first aspect, the present invention comprises a support system for mounting a load to a removable vehicle canopy on a vehicle, the assembly comprising a pair of support frames configured to be installed on opposing internal side walls of the removable vehicle canopy, a pair of support feet configured to be installed on an internal surface of the removable vehicle canopy, and a plurality of mounting elements on an external surface of the canopy and arranged for mounting the load thereto, each of the support frames and support feet having one of the plurality of mounting elements affixed thereto by a mechanical fastener extending through a hole in the canopy, wherein the support system is configured to be installable onto the removable vehicle canopy while the canopy is mounted to the vehicle, such that when the canopy having the support system installed is mounted to the vehicle, the support frames are in mechanical connection with opposing side walls of a tub of the vehicle, and the support feet are in mechanical connection with a structural element of the vehicle, and the support system substantially distributes the mounted load into the vehicle and substantially inhibits distribution into or through the canopy.

In an embodiment, each of the support frames comprise a first frame component and a second frame component that interfit with one another, and each of the first frame components and second frame components have one of the plurality of mounting elements affixed thereto.

In an embodiment, the support system, further comprises, for each support frame, a lateral frame component configured to connect an upper portion of the first frame component to an upper portion of the second frame component when the first and second frame components are interfit together. In an embodiment, the lateral frame component is further configured to temporarily attach to an affixed one of the plurality of mounting elements, and the temporarily-attached lateral frame component enables identification of a site for forming a hole for receiving a mechanical fastener of an adjacent one of the plurality of mounting elements.

In an embodiment, the support feet are configured to affix to the structural element of the vehicle. In an embodiment, the support feet are affixed to the structural element by at least one mechanical fastener extending therethrough and into engagement with the structural element. In an embodiment, the structural element of the vehicle is a rollbar, headache bar, roll cage or other structural bar of a vehicle.

In a second aspect, the present invention comprises a method of installing a support system for mounting a load to a removable vehicle canopy on a vehicle when the canopy is still mounted thereto, the method comprising the steps of, for each lateral side of the removable vehicle canopy that is mounted to the vehicle:
1. attaching a support frame to an internal side wall of the canopy;
2. forming a hole for receiving a mechanical fastener through the canopy;
3. attaching a mounting element to an external surface of the canopy and affixing the mounting element to the support frame by extending the mechanical fastener through the formed hole;
4. forming a further hole for receiving a further mechanical fastener through the canopy; and
5. positioning a support foot on an internal surface of the canopy and a further mounting element to the external surface of the canopy, each proximal to the further hole, and affixing the further mounting element to the support foot by extending the further mechanical fastener through the further hole and into engagement therewith;

wherein, while the canopy is mounted to the vehicle and in mechanical connection therewith, the support frame is in mechanical connection with a side wall of a tub of the vehicle, and the support foot is in mechanical connection with a structural element of the vehicle, and the support system substantially distributes the mounted load into the vehicle and substantially inhibits distribution into or through the canopy.

In an embodiment wherein the support frame comprises a first frame component and a second frame component that interfit with one another, the step of attaching the support frame to the internal side wall of the canopy comprises the steps of:

1. attaching the first frame component to the internal side wall; and
2. attaching the second frame component to the internal side wall, such that it interfits with the first frame component;

the step of forming the hole for receiving the mechanical fastener through the canopy comprises the steps of:
1. forming a first hole for receiving a first mechanical fastener; and
2. forming a second hole for receiving a second mechanical fastener;

and the step of attaching the mounting element and affixing the mounting element to the support frame comprises the steps of:
1. attaching a first mounting element to the external surface and affixing it to the first frame component by extending the first mechanical fastener through the first hole; and
2. attaching a second mounting element to the external surface and affixing it to the second frame component by extending the second mechanical fastener through the first hole.

In an embodiment, the support frame further comprises a lateral frame component, and the method comprises the additional step of, following the steps of attaching the first and second frame components, connecting the lateral frame component to an upper portion of the first frame component and to an upper portion of the second frame component.

In an embodiment, the step of forming the second hole for receiving the second mechanical fastener occurs after the step of attaching the first mounting element and affixing it to the first frame component, and comprises the steps of:
1. temporarily mounting the lateral frame component to the first mounting element;
2. temporarily mounting the second mounting element to the lateral frame component such that the second mounting element is resting on the external surface of the canopy and is aligned with the second frame component; and
3. using the second mounting element to locate a site for forming the second hole.

In an embodiment, the step of forming the further hole for receiving the further mechanical fastener occurs after the steps of affixing the first mounting element to the first frame component and affixing the second mounting element to the second frame component, and the step of forming the further hole for receiving the further mechanical fastener comprises the steps of:
1. temporarily mounting the lateral frame component to the first mounting element or the second mounting element, whichever is closer to the structural element of the vehicle;
2. temporarily mounting the further mounting element to the lateral frame component such that the further mounting element is resting on the external surface of the canopy and is aligned with the structural element; and
3. using the further mounting element to locate a site for forming the further hole.

Further embodiments of the invention may be disclosed herein or otherwise become apparent.

DESCRIPTION OF FIGURES

Embodiments of the present invention will now be described in relation to figures, wherein.

DEFINITIONS

As used herein, the term load is used in a generic sense to refer to any item, piece of equipment, structure or cargo that may be mounted to the roof of a vehicle. This may include load-carrying structures such as cargo trays, roof racks and luggage carriers. This may include equipment such as lighting fixtures, radio devices and other electronics, camping gear, tools and hardware. This may include other gear such as roof-top tents, awnings/shade sails, and any other forms of equipment that one may seek to attach to or mount upon the roof of a vehicle.

As used herein, the term 'maximum load tolerance' refers to the maximum load that a removable vehicle canopy is engineered to safely support.

As used herein, the term substantial or substantially, in the context of substantial distribution or inhibition in relation to a load force, should be understood by the skilled person to mean that the invention seeks to at least limit the load force transmitted into or through the removable vehicle canopy to below the maximum load tolerance.

DETAILED DESCRIPTION OF PREFERRED EMBODIMENTS

In a first aspect, the present invention relates to a support system for mounting a load to a vehicle. The support system comprises a pair of support frames and a pair of support feet, each of which are installed upon internal surfaces of the removable vehicle canopy. The system further comprises a plurality of mounting elements that are arranged for mounting the load thereto. There is at least one mounting element connected to each of the support frames and each of the support feet. The support system is configured to be able to be installed into the removable vehicle canopy while the canopy is mounted to the vehicle. The support system is further configured to substantially distribute the load into the vehicle and substantially inhibit distribution into or through the canopy, thereby enabling a load greater than the maximum load tolerance of the canopy to be carried by the vehicle.

Figure 1:
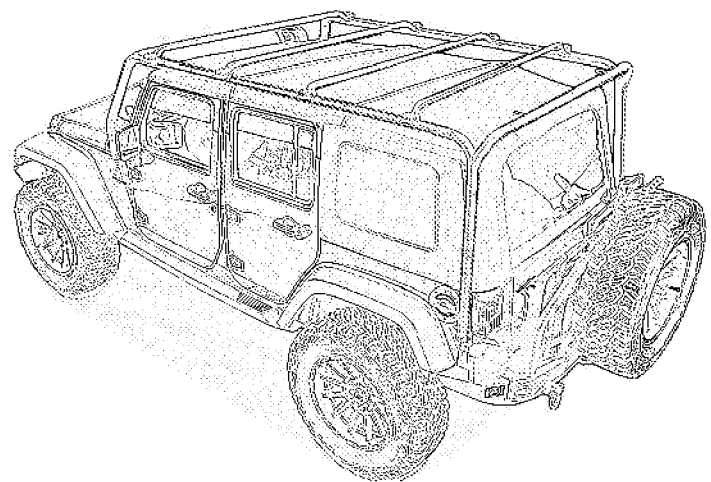
FIGS. 1, 2 & 3 depict prior art support systems and their installation means.
Figure 2:
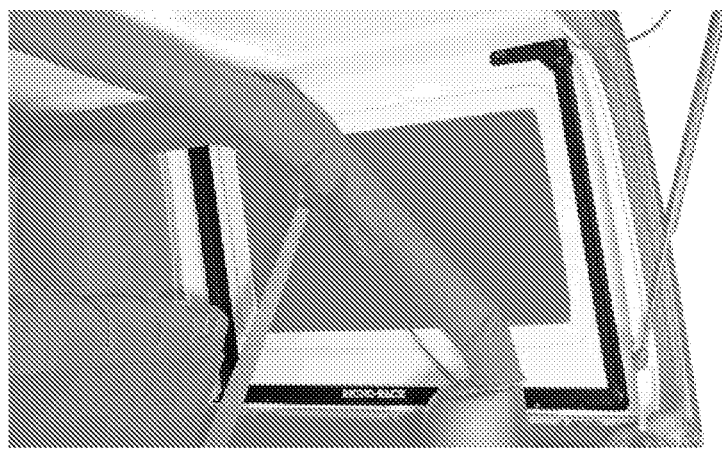
Figure 3:
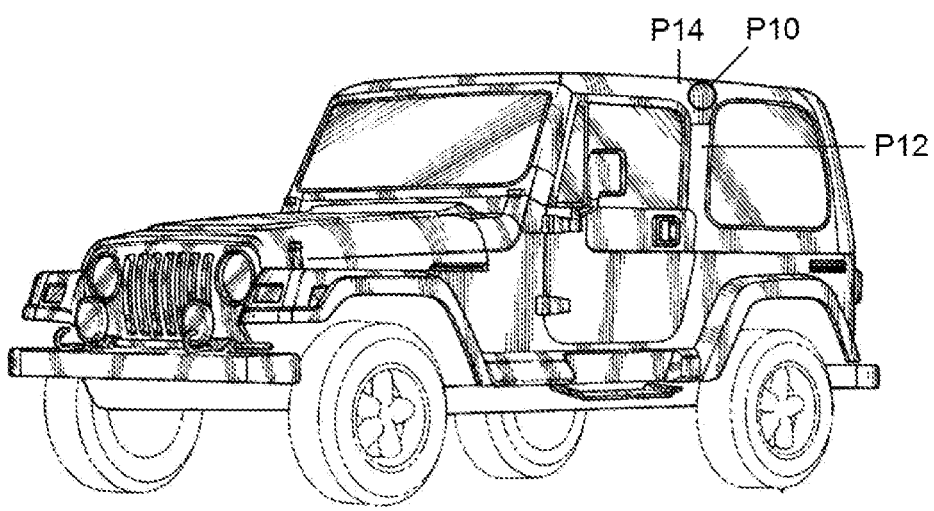
Figure 4:
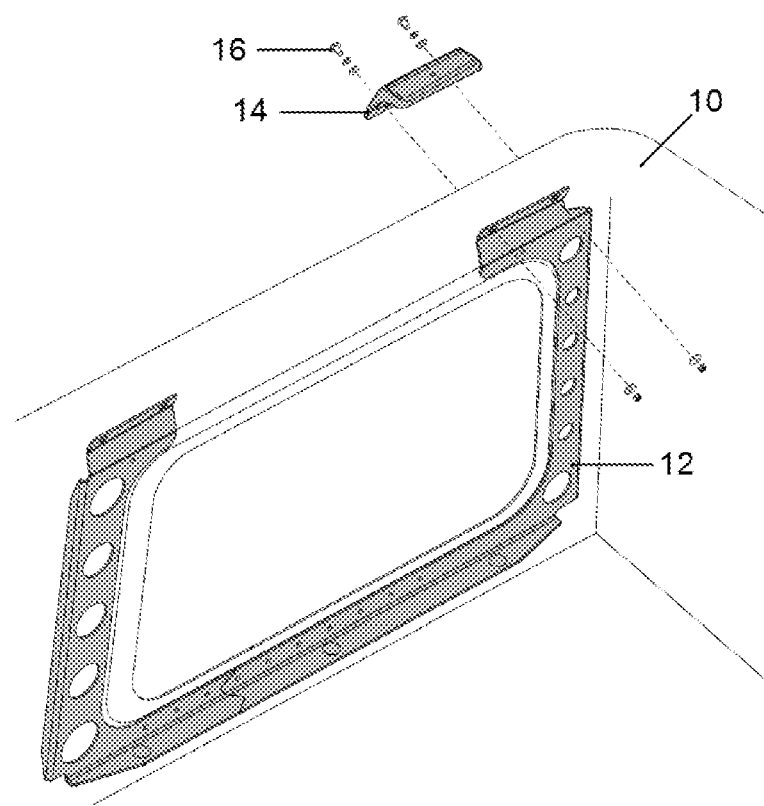
FIG. 4 depicts an embodiment of a support frame of the present invention.

Referring to FIG. 4, there is shown a removable canopy 10 of a vehicle, and an embodiment of one of the pair of support frames 12 of the present invention installed therein. In an embodiment, each of the pair of support frames 12 are configured to be installed on opposing internal side walls of the removable vehicle canopy 10. Also depicted are mounting elements 14 which are affixed to the support frame 12 by mechanical fasteners 16 extending through a hole in the canopy 10. The dashed lines in FIG. 4 depict the path of the mechanical fasteners 16 through the canopy 10. As the skilled person may appreciate, the embodiment of the support frame 12 depicted in FIG. 4 may have additional mounting elements 14 affixed thereto, although this is not shown. Without limiting the scope of the invention through theory, it is considered that by extending the mechanical fasteners through the canopy to directly affix the mounting elements to the support frame, a path for load transferral may be formed. In at least the embodiment depicted in FIG. 4, it is considered that a load mounted to the mounting elements 14 may be transferred from through the mounting elements and mechanical fasteners 16, and into the support frame 12. This may prevent, inhibit or at least substantially ameliorate the transferral of load into the vehicle canopy.

Figure 5:
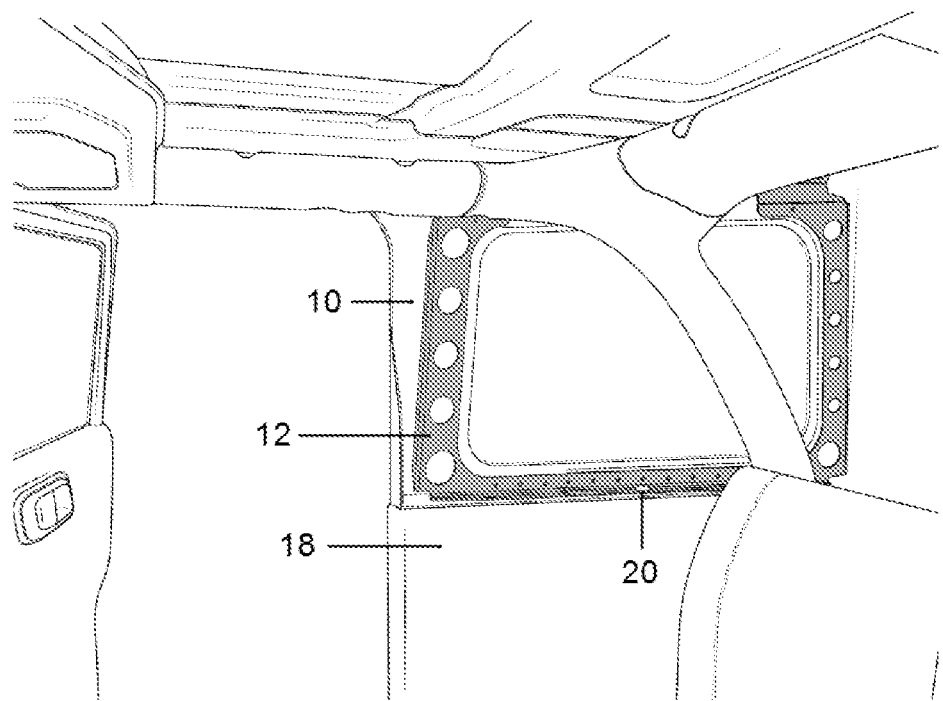
FIG. 5 depicts the support frame of FIG. 4 in connection with the tub sidewall of the vehicle.

Referring now to FIG. 5, at least one form of the canopy 10 is mounted and engaged with a sidewall 18 of the vehicle by canopy mounting fixtures 20. As the skilled person may appreciate, different means of engaging a canopy 10 to a vehicle sidewall 18 may be employed. In at least one embodiment, the support frame 12 is configured such that the canopy mounting fixtures 20 cooperate with and extend through the support frame 12. In embodiments wherein the canopy 10 engages with a vehicle sidewall through an alternate mounting means, the support frame 12 may be configured to cooperate with the alternate mounting means.

Without limiting the scope of the invention through theory, it is considered that use of the canopy mounting fixtures 20 (or alternate mounting means) to engage the support frame 12 with the vehicle sidewall 18 may enable a mounted load that is transferred into the support frame to be substantially transferred therefrom, through the canopy mounting fixtures 20 (or alternate mounting means) and into the vehicle sidewall 18. In at least the present embodiment, therefore, a load mounted to the mounting elements 14 may be transferred directly into the support frame 12, and from the support frame directly into the vehicle sidewall 18. In such an embodiment the load may therefore be substantially inhibited from transferring into or through the vehicle canopy itself.

Figure 6:
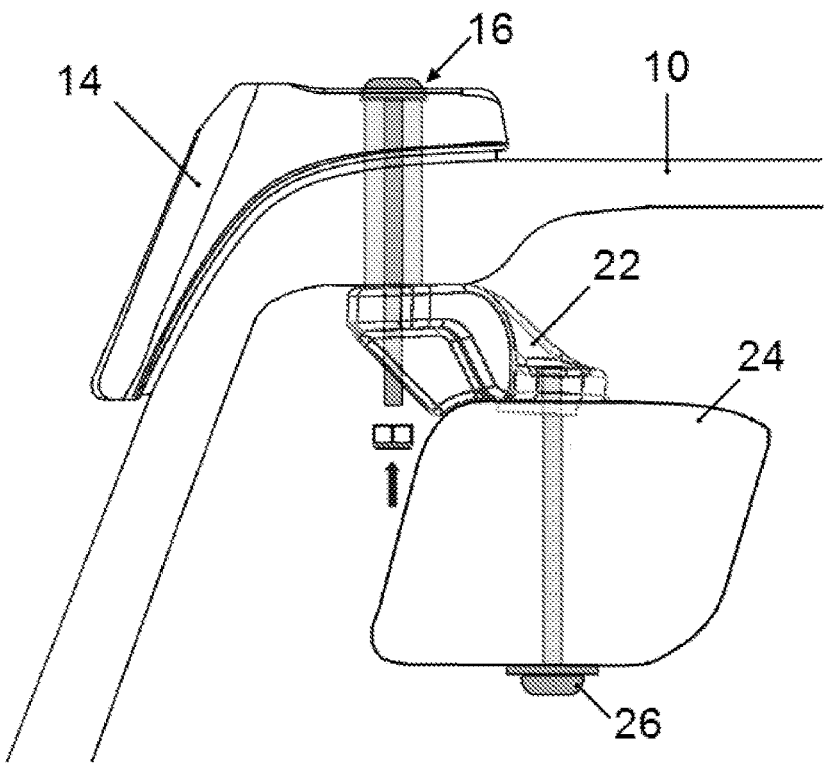
FIG. 6 depicts an embodiment of the invention comprising a support foot.

Referring to FIG. 6, the support system may further comprise at least a pair of support feet 22 that are installed on an internal surface of the vehicle canopy 10 and having at least one of the plurality of mounting elements 14 affixed thereto by mechanical fastener 16. The support feet 22 are installed such that, when the canopy 10 is mounted to the vehicle, the support feet 22 are in mechanical connection with a structural element 24 of the vehicle. The structural element 24 depicted in FIG. 6 is a sectional segment of a vehicle roll bar, with sections of the structural element 24 that are in front of or behind the plane of FIG. 6 removed for clarity.

Without limiting the scope of the invention through theory, it is considered that the support foot may enable a load to be transferred the mounting element 14 and into the structural element 24 of the vehicle without transferring into or through the canopy 10.

In at least one embodiment, the structural element may be a vehicle roll bar, roll cage, headache bar or other structural bar. In an alternate embodiment, the structural element may be a component of the chassis of the vehicle. In further alternate embodiments, the structural element may be a component of the vehicle that is adapted or configured to be load-bearing or capable thereof.

In an embodiment, the support feet 22 may be affixed to the structural element. In a further embodiment, the support feet may affix to the structural element 24 by at least one mechanical fastener 26 extending from the support foot and into fixed engagement with the structural element 24. Without limiting the scope of the invention through theory, it is considered that affixing the support foot to the structural element 24 may enable the transferral of loads as well as forces acting in different directions. As the skilled person may appreciate, a load may not be equally distributed across a vehicle canopy. Therefore, the load and other forces transferred into the vehicle may not be balanced or equally distributed, and may comprise compressive forces, tensile forces, upward-directed forces and shear forces. In an embodiment of the invention wherein the support foot is affixed to the structural element, forces other than load force may also be transferred from the load, through the mounting element 14, into the support foot 22 and then, via the affixing means, into the structural element 24 of the vehicle. In one embodiment, the mechanical fastener 26 may be a component of the structural element. In an alternate embodiment, the mechanical fastener 16 may be a component of the support foot 22. In a further alternate embodiment, the mechanical fastener 26 may be a fastener such as a bolt. In each embodiment, the support foot 22 and mechanical fastener 26 are configured to be installable without removing or dismounting the canopy 10 from the vehicle.

Figure 7:
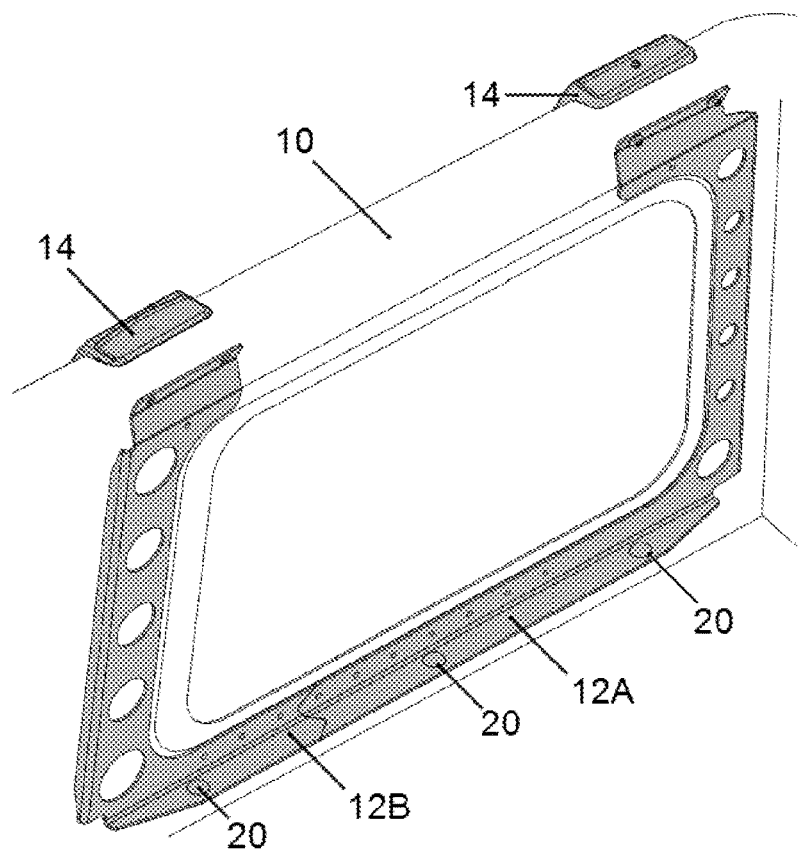
FIG. 7 depicts an embodiment of the support frame of the invention comprising a first and second frame component.

In an embodiment and with reference to FIG. 7, the support frame 12 may comprise a first frame component 12A and a second frame component 12B that are configured to interfit with one another. In this embodiment, separate mounting elements 14A, 14B are affixed to each of the first and second frame components 12A, 12B. It is considered that an embodiment wherein each of the support frames comprise a first and second component 12A, 12B may enable installation of the support system without requiring removal of the canopy 10 from the vehicle, by allowing for the components of the support system to be manoeuvred around internal structural features of the vehicle which may otherwise interfere with the installation process.

Figure 8:
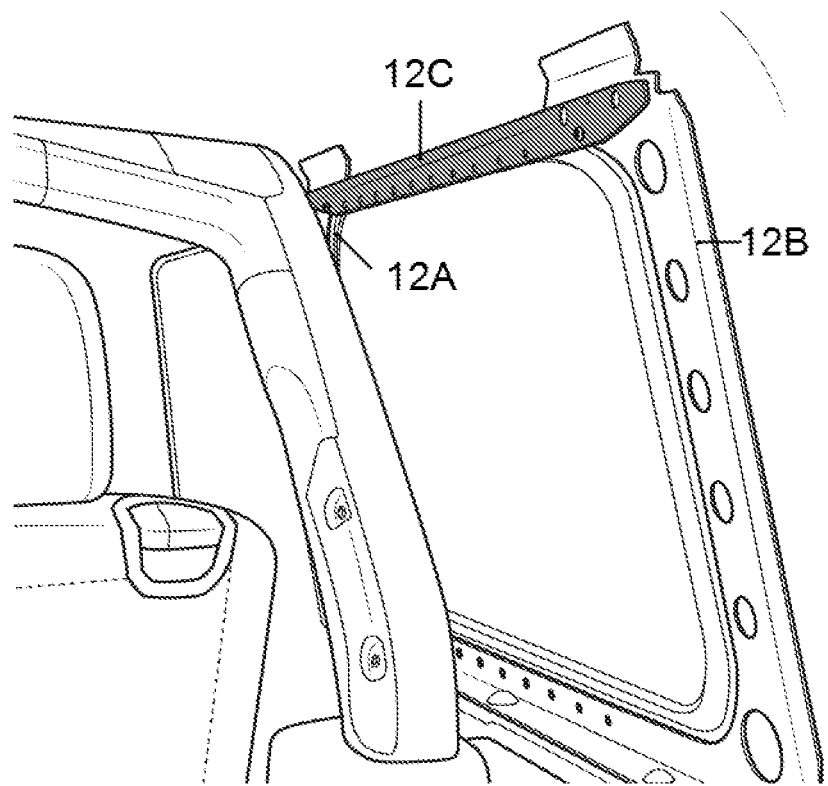
FIG. 8 depicts an embodiment of FIG. 7, further comprising a lateral frame component.

In a further embodiment of the invention and with reference to FIG. 8, each support frame 12 may comprise a lateral frame component 12C that connects an upper portion of the first frame component 12A to an upper portion of the second frame component 12B when the first and second frame components are interfit together. The lateral frame component 12C may provide rigidity and strength to the support frame 12.

Figure 9:
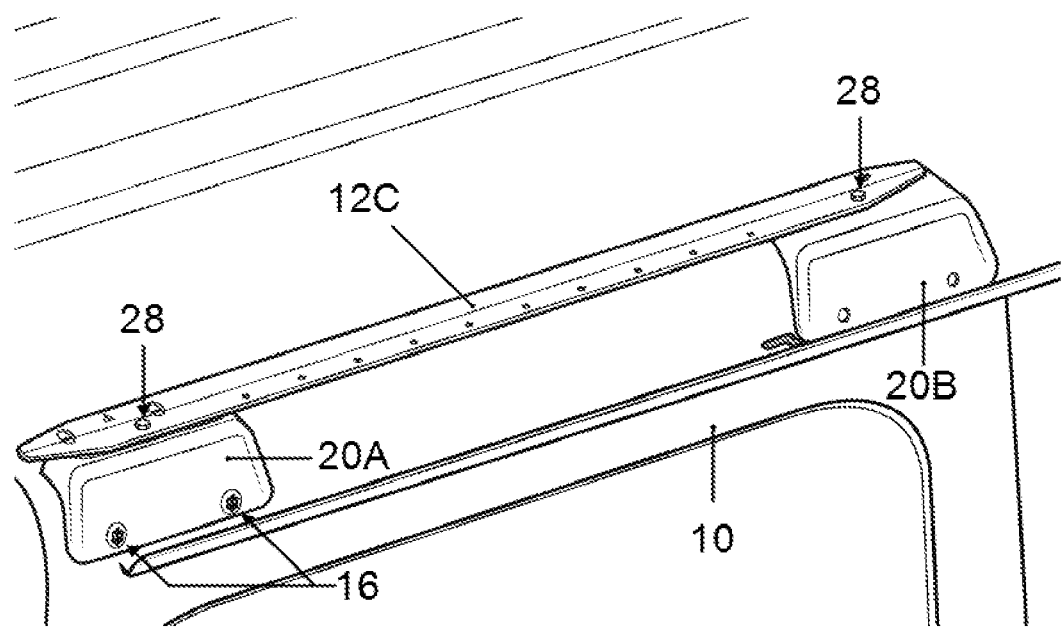
FIG. 9 depicts an embodiment of the lateral frame component of FIG. 8 having a secondary function to locate mounting elements.

In a further embodiment of the present invention and with reference to FIG. 9, the lateral frame component 12C may be further configured to temporarily attach to an affixed one of the plurality of mounting elements 14 and provide a means of identifying where a hole for receiving a mechanical fastener 16 of an adjacent mounting element 14 is to be formed. As depicted in FIG. 9, one mounting element 14A is affixed to the canopy 10 by a pair of mechanical fasteners 16, while a second mounting element 14B is not. The lateral frame component 12C is temporarily connected to each of the first and second mounting elements 14A, 14B by temporary fasteners 28, which enables a user to locate the holes for mechanical fasteners 16 for affixing second mounting element 14BB to the support frame 12 or to the support foot 22. In at least the present embodiment, the support frames 12 and support feet 22 are configured such that upon installation to one side of the vehicle canopy 10, the affixed mounting elements 14 are equidistant apart.

The skilled person will appreciate that the second mounting element 14B may be affixed to the second frame component 12B first, and then used in combination with the lateral frame component 12C to locate the site for installation of the first mounting element 14A. In other words, either the first mounting element 14A or second mounting element 14B may be permanently affixed first and used to locate installation of the other.

As the skilled person will appreciate, the configuration of a vehicle may not always enable each mounting element on one side of the canopy to be affixed at equal distances from one another. Vehicles may also have different vehicle canopy types that are available, some of which may prevent or inhibit equidistant installation of mounting elements 14 to an external surface thereof.

In these scenarios, the present invention may provide an embodiment of the lateral frame component having a plurality of holes for receiving a temporary fastener 28, wherein each of the plurality of holes corresponds to different makes and models of vehicle and/or vehicle canopy.

In a second aspect, the present invention provides for a method of installing a support system for mounting a load to a removable vehicle canopy 10 on a vehicle when the canopy 10 is still mounted thereto, such that the support system substantially distributes the mounted load into the vehicle and substantially inhibits distribution into or through the canopy 10. In an embodiment, the support system is an embodiment of the first aspect of the invention. In an embodiment, the method comprises the steps of, for each lateral side of the removable vehicle canopy 10:

1. attaching a support frame 12 to an internal side wall of the canopy 10;
2. forming a hole for receiving a mechanical fastener 16 through the canopy 10;
3. attaching a mounting element 14 to an external surface of the canopy 10 and affixing the mounting element 14 to the support frame 12 by extending the mechanical fastener 16 through the formed hole;
4. forming a further hole for receiving a further mechanical fastener 16 through the canopy 10; and
5. positioning a support foot 22 on an internal surface of the canopy 10 and a further mounting element 14 to the external surface of the canopy 10, each proximal to the further hole, and affixing the further mounting element 14 to the support foot 22 by extending the further mechanical fastener 16 through the further hole and into engagement therewith.

In an embodiment, the method is enacted while the canopy 10 is mounted to the vehicle and in mechanical connection therewith. In a further embodiment, once the method is enacted and when the canopy 10 is mounted to the vehicle and in mechanical connection therewith, the support frame 12 is in mechanical connection with a tub side wall 18 of the vehicle, and the support foot 22 is in mechanical connection with a structural element of the vehicle.

In an embodiment wherein the support frame 12 comprises a first frame component 12A and a second frame component 12B that interfit with one another, step one of the method laid out above may comprise the steps of:

1. attaching the first frame component 12A to the internal side wall; and
2. attaching the second frame component 12B to the internal side wall, such that it interfits with the first frame component 12A.

In a further embodiment, the step of forming the hole for receiving the mechanical fastener 16 through the canopy 10 comprises the steps of:

1. forming a first hole for receiving a first mechanical fastener 16; and
2. forming a second hole for receiving a second mechanical fastener 16.

In a further embodiment, the step of attaching the mounting element 14 and affixing the mounting element 14 to the support frame comprises the steps of:

1. attaching a first mounting element 14A to the external surface and affixing it to the first frame component 12A by extending the first mechanical fastener 16 through the first hole; and
2. attaching a second mounting element 14B to the external surface and affixing it to the second frame component 12B by extending the second mechanical fastener 16 through the first hole.

In an embodiment wherein the support frame 12 comprises a first frame component 12A and a second frame component 12B that interfit with one another, the support frame may further comprise a lateral frame component 12C. In such an embodiment, the method may comprise the additional step of, following the steps of attaching the first and second frame components 12A, 12B, connecting the lateral frame component 12C to an upper portion of the first frame component 12A and to an upper portion of the second frame component 12B.

In a further embodiment, the step of forming the second hole for receiving the second mechanical fastener 16 occurs after the step of attaching the first mounting element 14A and affixing it to the first frame component 12A, and comprises the steps of:

1. temporarily mounting the lateral frame component 12C to the first mounting element 14A;
2. temporarily mounting the second mounting element 14B to the lateral frame component 12C such that the second mounting element 14B is resting on the external surface of the canopy 10 and is aligned with the second frame component 12B; and
3. using the second mounting element 14B to locate a site for forming the second hole.

In a further embodiment, the step of forming the further hole for receiving the further mechanical fastener 16 occurs after the steps of affixing the first mounting element 14A to the first frame component 12A and affixing the second mounting element 14B to the second frame component 12B, and the step of forming the further hole for receiving the further mechanical fastener 16 comprises the steps of:

1. temporarily mounting the lateral frame component 12C to the first mounting element 14A or the second mounting element 14B, whichever is closer to the structural element of the vehicle;
2. temporarily mounting the further mounting element 14 to the lateral frame component 12C such that the further mounting element 14 is resting on the external surface of the canopy 10 and is aligned with the structural element; and
3. using the further mounting element 14 to locate a site for forming the further hole.

While the invention has been described with reference to preferred embodiments above, it will be appreciated by those skilled in the art that it is not limited to those embodiments, but may be embodied in many other forms, variations and modifications other than those specifically described. The invention includes all such variation and modifications. The invention also includes all of the steps, features, components and/or devices referred to or indicated in the specification, individually or collectively and any and all combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Any promises made in the present document should be understood to relate to some embodiments of the invention, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

The invention claimed is:

1. A support system for mounting a load to a removable vehicle canopy on a vehicle, the system comprising:
    a pair of support frames configured to be installed on opposing internal side walls of the removable vehicle canopy; and
    a pair of support feet configured to be installed on an internal surface of the removable vehicle canopy; and
    a plurality of mounting elements on an external surface of the canopy and arranged for mounting the load thereto, each of the support frames and support feet having one of the plurality of mounting elements affixed thereto by a mechanical fastener extending through a hole in the canopy;
    wherein the support system is configured to be installable onto the removable vehicle canopy while the canopy is mounted to the vehicle;
    when the canopy having the support system installed is mounted to the vehicle, the support frames are in mechanical connection with opposing side walls of a tub of the vehicle, and the support feet are in mechanical connection with a structural element of the vehicle; and
    the support system substantially distributes the mounted load into the vehicle and substantially inhibits distribution into or through the canopy.

2. The support system of claim 1 wherein each of the support frames comprise a first frame component and a second frame component that interfit with one another; and
    each of the first frame components and second frame components have one of the plurality of mounting elements affixed thereto.

3. The support system of claim 2, further comprising, for each support frame, a lateral frame component configured to connect an upper portion of the first frame component to an upper portion of the second frame component when the first and second frame components are interfit together.

4. The support system of claim 3, wherein the lateral frame component is further configured to temporarily attach to an affixed one of the plurality of mounting elements; and
    the temporarily-attached lateral frame component enables identification of a site for forming a hole for receiving a mechanical fastener of an adjacent one of the plurality of mounting elements.

5. The support system of claim 1, wherein the support feet are configured to affix to the structural element of the vehicle.

6. The support system of claim 5, wherein the support feet are affixed to the structural element by at least one mechanical fastener extending therethrough and into engagement with the structural element.

7. The support system of claim 1, wherein the structural element of the vehicle is a member selected from the group consisting of a rollbar, a headache bar, a roll cage and an other structural bar of a vehicle.

8. A method of installing a support system for mounting a load to a removable vehicle canopy on a vehicle when the canopy is still mounted thereto, the method comprising the steps of, for each lateral side of the removable vehicle canopy that is mounted to the vehicle:
   attaching a support frame to an internal side wall of the canopy;
   forming a hole for receiving a mechanical fastener through the canopy;
   attaching a mounting element to an external surface of the canopy and affixing the mounting element to the support frame by extending the mechanical fastener through the formed hole;
   forming a further hole for receiving a further mechanical fastener through the canopy;
   positioning a support foot on an internal surface of the canopy and a further mounting element to the external surface of the canopy, each proximal to the further hole, and affixing the further mounting element to the support foot by extending the further mechanical fastener through the further hole and into engagement therewith;
   wherein, while the canopy is mounted to the vehicle and in mechanical connection therewith, the support frame is in mechanical connection with a side wall of a tub of the vehicle, and the support foot is in mechanical connection with a structural element of the vehicle; and
   the support system substantially distributes the mounted load into the vehicle and substantially inhibits distribution into or through the canopy.

9. The method of claim 8, wherein the support frame comprises a first frame component and a second frame component that interfit with one another;
   the step of attaching the support frame to the internal side wall of the canopy comprises the steps of:
   attaching the first frame component to the internal side wall; and
   attaching the second frame component to the internal side wall, such that it interfits with the first frame component; the step of forming the hole for receiving the mechanical fastener through the canopy comprises the steps of:
   forming a first hole for receiving a first mechanical fastener; and
   forming a second hole for receiving a second mechanical fastener;
   and the step of attaching the mounting element and affixing the mounting element to the support frame comprises the steps of:
   attaching a first mounting element to the external surface and affixing the first mounting element to the first frame component by extending the first mechanical fastener through the second hole; and
   attaching a second mounting element to the external surface and affixing it to the second frame component by extending the second mechanical fastener through the first hole.

10. The method of claim 9, wherein the support frame further comprises a lateral frame component; and
   the method comprising the additional step of, following the steps of attaching the first and second frame components, connecting the lateral frame component to an upper portion of the first frame component and to an upper portion of the second frame component.

11. The method of claim 10, wherein the step of forming the second hole for receiving the second mechanical fastener occurs after the step of attaching the first mounting element and affixing it to the first frame component, and comprises the steps of:
   temporarily mounting the lateral frame component to the first mounting element;
   temporarily mounting the second mounting element to the lateral frame component such that the second mounting element is resting on the external surface of the canopy and is aligned with the second frame component; and
   using the second mounting element to locate a site for forming the second hole.

12. The method of claim 11, wherein the step of forming the further hole for receiving the further mechanical fastener occurs after the steps of affixing the first mounting element to the first frame component and affixing the second mounting element to the second frame component; and
   the step of forming the further hole for receiving the further mechanical fastener comprises the steps of:
   temporarily mounting the lateral frame component to the first mounting element or the second mounting element, whichever is closer to the structural element of the vehicle;
   temporarily mounting the further mounting element to the lateral frame component such that the further mounting element is resting on the external surface of the canopy and is aligned with the structural element; and
   using the further mounting element to locate a site for forming the further hole.

13. The method of claim 10, wherein the step of forming the further hole for receiving the further mechanical fastener occurs after the steps of affixing the first mounting element to the first frame component and affixing the second mounting element to the second frame component; and
   the step of forming the further hole for receiving the further mechanical fastener comprises the steps of:
   temporarily mounting the lateral frame component to the first mounting element or the second mounting element, whichever is closer to the structural element of the vehicle;
   temporarily mounting the further mounting element to the lateral frame component such that the further mounting element is resting on the external surface of the canopy and is aligned with the structural element; and
   using the further mounting element to locate a site for forming the further hole.

* * * * *